US011391870B2

(12) United States Patent
Rahomäki et al.

(10) Patent No.: US 11,391,870 B2
(45) Date of Patent: Jul. 19, 2022

(54) HEIGHT-MODULATED DIFFRACTIVE MASTER PLATE AND METHOD OF MANUFACTURING THEREOF

(71) Applicant: Dispelix Oy, Espoo (FI)

(72) Inventors: Jussi Rahomäki, Espoo (FI); Ismo Vartiainen, Espoo (FI)

(73) Assignee: Dispelix Oy, Espoo (FI)

( * ) Notice: Subject to any disclaimer, the term of this patent is extended or adjusted under 35 U.S.C. 154(b) by 399 days.

(21) Appl. No.: 16/618,178

(22) PCT Filed: May 18, 2018

(86) PCT No.: PCT/FI2018/050379
§ 371 (c)(1),
(2) Date: Nov. 29, 2019

(87) PCT Pub. No.: WO2018/220270
PCT Pub. Date: Dec. 6, 2018

(65) Prior Publication Data
US 2020/0110206 A1    Apr. 9, 2020

(30) Foreign Application Priority Data
Jun. 2, 2017  (FI) ...................................... 20175506

(51) Int. Cl.
*G02B 5/18*  (2006.01)
*B29D 11/00*  (2006.01)
*G02B 27/01*  (2006.01)

(52) U.S. Cl.
CPC ...... *G02B 5/1857* (2013.01); *B29D 11/00769* (2013.01); *G02B 5/1828* (2013.01); *G02B 27/0172* (2013.01); *G02B 2027/0178* (2013.01)

(58) Field of Classification Search
CPC ................ G02B 5/1857; G02B 5/1828; G02B 27/0172; G02B 2027/0178; B29D 11/00769
(Continued)

(56) References Cited

U.S. PATENT DOCUMENTS 3,944,420 A    3/1976  Gale et al.
6,545,808 B1 *  4/2003  Ehbets ............... G02B 6/02085
                                                                    359/569
(Continued)

FOREIGN PATENT DOCUMENTS

CA    2214927       4/1999
CN    1797199 A    7/2006
(Continued)

OTHER PUBLICATIONS

DAVID: Fabrication of stair-case profiles with high aspect ratios for blazed diffractive optical elements. Microelectronic Engineering, 2000, vol. 53, pp. 677-680.

*Primary Examiner* — Collin X Beatty
(74) *Attorney, Agent, or Firm* — Laine IP Oy

(57) ABSTRACT

The invention relates to a method of fabricating a master plate for producing diffractive structures and a master plate obtainable therewith. The method comprises providing a substrate having a periodic surface profile, filling the surface profile uniformly at least partly with filling material, and partially removing the filling material in order to produce a master plate having a periodic height-modulated surface profile formed by said substrate and said filling material. The invention allows for producing master plates capable of further producing gratings with variable diffraction efficiency.

12 Claims, 4 Drawing Sheets

(58) Field of Classification Search
USPC .......................................................... 359/569
See application file for complete search history.

(56) References Cited

U.S. PATENT DOCUMENTS

| | | | |
|---|---|---|---|
| 9,791,623 B2* | 10/2017 | Magnusson | G02B 5/288 |
| 10,649,141 B1* | 5/2020 | Colburn | H01J 37/3056 |
| 11,175,455 B1* | 11/2021 | Colburn | H01L 21/0274 |
| 2002/0122255 A1 | 9/2002 | Ogusu et al. | |
| 2003/0022070 A1 | 1/2003 | Lee et al. | |
| 2013/0215406 A1* | 8/2013 | Heussler | G01J 3/021 |
| | | | 359/566 |
| 2016/0033784 A1 | 2/2016 | Levola et al. | |
| 2017/0307887 A1* | 10/2017 | Stenberg | G02B 26/0808 |

FOREIGN PATENT DOCUMENTS

| | | |
|---|---|---|
| CN | 103901520 A | 7/2014 |
| CN | 106662684 A | 5/2017 |
| CN | 105785493 B | 1/2019 |
| GB | 1362418 A | 8/1974 |
| JP | H1078667 A | 3/1998 |
| JP | H1131863 A | 2/1999 |
| JP | 2007212575 A | 8/2007 |
| WO | WO2009005822 A1 | 1/2009 |
| WO | WO2016185602 A1 | 11/2016 |

\* cited by examiner

HEIGHT-MODULATED DIFFRACTIVE MASTER PLATE AND METHOD OF MANUFACTURING THEREOF

FIELD OF THE INVENTION

The invention relates to manufacturing of micro- and nanostructures for optical purposes. In particular, the invention relates to manufacturing a master plate for producing diffractive gratings, which can be used for example in display applications, such as near-to-eye displays.

BACKGROUND OF THE INVENTION

Near-to-eye displays (NEDs) and head-up displays (HUDs) typically involve diffractive gratings to produce a viewable image. Gratings are needed as in-coupling gratings, which couple an image from an image source to a wave guide, as out-coupling gratings, which produce the final viewable image for the user, and as exit pupil expanders (EPEs), which increase the size of the displays exit pupil.

The quality and characteristics of the gratings determine the quality of resulting image. In addition to having distinct and consistent grating lines, in advanced applications it is desirable to be able to control the diffraction efficiency of the grating locally. This can be achieved by varying grating line height or fill factor within the grating, i.e. using height or fill factor modulation. To achieve the largest possible efficiency adjustment range, both height and fill factor should be modulated. Thus, there is a need for robust and cost-effective fabrication methods for diffractive gratings in which diffraction efficiency can be freely controlled, and which are applicable for mass production.

Grayscale lithography provides a way to fabricate structures with varying structure height. However, because of the low contrast of the process, the sidewalls are typically rounded and not entirely vertical. Also the control of grayscale-lithographic processes is challenging. In addition, direct lithography and etch processes are very difficult to tune to provide high accuracy in vertical dimension, especially when features of the grating, i.e. ridges and grooves, contain several aspect ratios and depths over a large surface area. It is also difficult to achieve perfectly vertical sidewalls of features using these methods in combination with height modulation. Stamping techniques, on the other hand, require a high-quality master plate and a stamp manufactured using the master plate, whereby the main challenge is in the manufacturing of the master.

Fabrication of height-modulated structures is generally done by repeating fabrication cycles in which one height is defined within one cycle. This requires several exposures with high precision alignment, see for example C. David, "Fabrication of stair-case profiles with high aspect ratios for blazed diffractive optical elements", *Microelectronic Engineering*, 53 (2000). Because of the complexity of the method, the yield is low. This method provides good control over the vertical sidewalls but suffers from complexity and required precision. Moreover, overlay exposure requires a lateral placement accuracy in nanometer level, and any deviations from optimal causes losses in optical performance.

In summary, providing high-quality height and fill factor modulation, and in particular their combination, in industry scale mass production of diffractive gratings is currently challenge and there is a need for improved tools and methods for this purpose.

SUMMARY OF THE INVENTION

It is an aim of the invention to overcome at least some of the drawbacks of prior art and to provide a novel solution for producing diffractive structures. In particular, it is an aim to provide a method of producing a high-quality height-modulated master plate to be used in stamping technique and a corresponding master plate It is also an aim to provide a solution in which height modulation and fill factor modulation can be combined.

The invention is based on the idea of using a substrate with a periodic structure having period in the optically diffractive range and filling the structure with filling material that is then removed e.g. by etching so that the resulting surface profile contains height modulation. An uneven mask of e.g. optical or physical mask layer type can be used in the removal process to determine final modulation characteristics of the plate.

The method according to the invention comprises fabricating a master plate for producing diffractive structures by
providing a substrate having a periodic initial surface profile,
filling the initial surface profile uniformly at least partially with filling material, and
removing the filling material partially in order to produce a master plate having a periodic height-modulated surface profile formed by said substrate and said filling material.

The removal step may comprise e.g. using grayscale lithography or using physical mask layer on top of the filling, as explained below in more detail.

The present master plate for producing diffractive structures comprises
a substrate comprising a periodic pattern of features and gaps between the features,
filling material provided in said gaps in uneven amounts such that the master plate comprises a height-modulated surface profile.

Thus, the height-modulated profile is defined by the original surface profile in combination with the filling material.

The initial surface profile can be a binary, i.e. a two-height profile, or any other profile with a periodically repeating single-shape feature pattern, such as a profile formed of similar triangular features or similar slanted features, instead of rectangular features.

More specifically, the invention is characterized by what is stated in the independent claims.

The invention offers significant benefits.

First, the invention solves the problem of low quality structures of direct lithographic methods involving height-modulation due to low contrast and resulting rounded sidewalls. In the present method, the sidewalls are defined by the substrate, which is manufactured for example by binary processing leading to very well defined vertical sidewalls. Binary processing is very well known and easy to control. The following uneven material removal step is introduced to achieve the height modulation. Thus, the vertical sidewalls of the features are defined by the binary structure and the height differences of the features by the filling layer. A combination of these two leads to precisely controllable profile shape and height that is difficult to achieve by other methods. Similar advantages apply to e.g. triangular initial surface profiles.

The invention allows for producing master plates capable of further producing gratings with variable diffraction efficiency. In particular, the present method allows for lateral variation of diffraction efficiency using height modulation, and optionally also using fill factor modulation, in combination with high-quality diffractive structures.

The dependent claims are directed to selected embodiments of the invention.

In some embodiments, the uneven partial removal of the filling layer comprises grayscale lithographic removal. This covers any method where different exposure doses result in different dissolving rates of the exposed filling material and therefore different heights in the filling layer. Thus, the term covers both so-called direct write methods, where the exposure of the material, and therefore the thickness of material removed, is controlled directly by the exposure source used, such as laser, electron or x-ray source, and methods using an optical mask and a light source with essentially even brightness and typically laterally broad exposure. The exposure may be carried out using photons (light) or electrons (optical or electron beam exposure, respectively). A combination or variation of direct write and optical mask methods is also possible.

The partial removal of the filling layer can be carried out, for example, using a photolithographic etching method directly after application of a suitable resist layer as the the filling layer. This makes the process very quick and robust. The materials of the substrate and the resist layer and the etching method are chosen to be selective such that only the resist layer is modified and in particular the vertical sidewalls of the binary features remain intact.

In some embodiments, the modulation in the resist layer is transferred to the substrate material by dry etching.

In some embodiments, the uneven mask comprises a physical mask in the form of a mask layer applied on the filling material. The mask layer has a laterally varying height, whose height profile corresponds to the desired modulation of the plate. After that, applying laterally uniform etching process or other suitable removal process results in the replication of the height profile to the filling material. The mask layer may comprise the same material as the filling layer or any other material etchable together with the filling layer.

In general, removal using a physical mask layer covers any removal methods that utilize an additional sacrificial mask layer on top of the filling layer, wherein the sacrificial mask layer has an effect on the local thickness of remaining filling layer.

A combination of grayscale lithography and physical mask technique is also possible.

In some embodiments, a resist layer is applied on a filling layer as explained above and a grayscale exposure is applied either by using direct write or an optical mask with varying transmission intensities. This height variation in the resist layer is then transferred to the filling layer by dry etching or wet etching.

In some embodiments, the removal process results in a surface profile with at least two distinct segments of different modulation heights. The boundary of the segments can be discrete, whereby there is a stepwise height difference between the segments. The grating may comprise for example 2-500 segments having different height characteristics. On the other hand, there may be a lateral height gradient, whereby no clear region boundary can be seen, and the diffraction efficiency is changing smoothly. Using any of these schemes, or their combination, it is possible to form into the height-modulated surface profile regions with different profile heights, and therefore different diffraction efficiencies.

A lateral height gradient can be produced by photolithography, for example, using direct writing, an optical gradient mask or a physical gradient mask. The gradient may be a linear gradient or a non-linear gradient.

In some embodiments, the surface profile is entirely filled with the filling material before the removal is initiated. This allows for utilization of the entire height of the profile for modulation and also ensures complete filling of the profile. In particular, the substrate can be planarized with the filling material.

In some embodiments, the surface profile comprises a periodic pattern of a plurality of features having rectangular or triangular cross-section and elongated form. For example, the pattern may be a line grating pattern capable of producing a one-dimensional linear grating. On the other hand, also production of two-dimensional gratings is possible, with e.g. a two-dimensional array of dot features, whereby the initial surface profile of the substrate and the final surface profile of the master plate are doubly periodic. A combination of these is also possible.

In some embodiment, the binary surface profile comprises fill factor modulation, which using the present method is maintained and replicated to the resulting surface profile of the plate.

In some embodiments, the substrate is manufactured by providing a substrate plate and removing material from the substrate plate, for example by electron beam lithography, or adding material to the plate, for example by nanoimprinting, to produce the binary surface profile thereon.

In some embodiments, the height-modulated surface profile comprises vertical sidewalls and feature tops, which are entirely defined by the substrate, and gap bottoms which are entirely defined by the filling material.

In typical optical applications, in particular wearable display applications, the required area of the master plate is at least 1 cm$^2$, such as 2-500 cm$^2$, which is readily achievable with the present process. The period of the master grating is typically 10 μm or less, in particular 1 μm or less, such as 200-800 nm.

Next, embodiments of the invention and advantages thereof are discussed in more details with reference to the attached drawings.

DETAILED DESCRIPTION OF EMBODIMENTS

Definitions

The term "binary surface profile" herein essentially means a surface with a relief structure consisting of two heights. In a line grating the possible heights are defined by tops of ridges and bottoms of grooves adjacent to the ridges. The profile therefore consists of cross-sectionally essentially rectangular surface features (with entirely vertical sidewalls). Binary surface profile is used an example in the following discussion and drawings, although other profiles are also possible, as discussed above.

Filling with filling material, unless otherwise mentioned, covers full filling and partial filling. "Planarization" means full filling such that enough filling material is provided on the surface profile to embed the binary features of the profile so that a planar surface made of the filling material is formed.

"Partial removal" of filling material means that at least some thickness of filling material is left on at least some location of the substrate.

"Height modulation" refers to variation of dimension of grating features in the normal direction of the substrate. For example, in the case of a line grating, height is measured from the bottom of a groove adjacent to a ridge to the top of the ridge. A height-modulated master plate thus comprises at least two lateral segments, either in one or two dimensions, with different feature heights between the regions.

The term "fill factor" refers to the proportion of grating structure material to surrounding material (e.g. air or other solid material) within a grating period. In the typical case of rectangular grating lines, this equals to the proportion of line width to period width. Consequently, "fill factor modulation" refers to variation of fill factor in the lateral dimensions of the grating, i.e. between periods of the periodic structure.

Description of Selected Embodiments

In its preferred embodiments, the present method combines highly anisotropic high resolution binary processing of the substrate and height modulation by lower lateral resolution grayscale lithography of the added filling material. Thus, it enables better control of the high-resolution vertical features and the sidewall profiles in comparison with direct grayscale lithography, where vertical sidewalls are difficult to achieve. Two basic embodiments are described below.

Figure 1A:
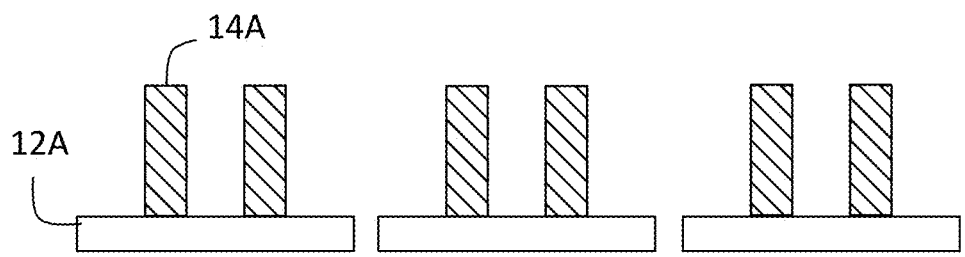
FIGS. 1A-1C illustrate in cross-sectional views fabrication of a master plate according to one embodiment of the present method in different stages of fabrication.
Figure 1B:
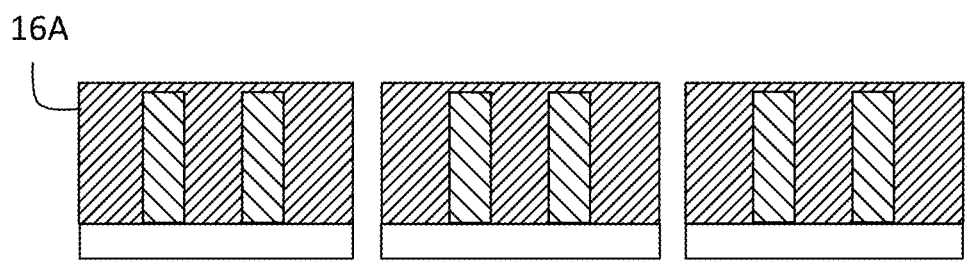
Figure 1C:
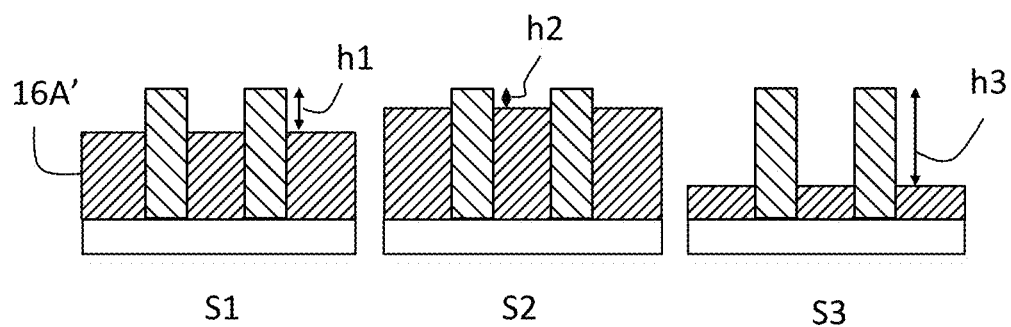

FIGS. 1A-1C illustrate the first basic embodiment, which uses a grayscale lithography step to produce the height modulation on the binary substrate.

In the first step illustrated by FIG. 1A, a binary structure with a possible fill factor modulation (not shown here) is fabricated using for example optical, electron beam lithography, embossing or nanoimprint lithography. The structure comprises a base plate 12A and binary elements 14A extending from the base plate 12A. At this point all the elements 14A have the same height. Depending on the fabrication method, the base plate 12A and binary elements 14A may comprise a unitary piece of single material or be made of different materials. For example, the elements 14A may comprise polymer added on an inorganic or polymeric base plate 12A. Alternatively, the substrate can be polymeric or inorganic unitary entity into which the features are processed by lithographic methods. Fill factor modulation, including line width modulation, gap width modulation or both, can also be included. This layer is referred to as grating layer.

Next, as illustrated by FIG. 1B, the binary structure 12A, 14A is coated with an electron beam or optical lithography resist material, to at least partially fill the gaps between the elements 14A, and typically so that the grating layer is fully covered with the resist material and the surface of the structure is planarized with a fill layer 16A. A spin-coating, spray-coating, casting or dip-coating method, for example, can be used.

Next, illustrated by FIG. 1C, a grayscale lithography is performed to the fill layer 16A. This kind of an overlay grayscale exposure results in different development speeds caused by different exposure doses and different heights arising from the surface. As a result, several regions S1, S2, S3 of different element heights h1, h2, h3, respectively, are formed, defined by the thickness of the fill layer 16A' at each region.

As mentioned above, the grayscale lithography may be carried out using direct writing with a laser, for example, according to an exposure scheme corresponding to the desired modulation or using an optical mask producing an illumination pattern having simultaneously a plurality of distinct regions of different intensities corresponding to the desired modulation. Instead or in addition to distinct regions, a continuous gradient may be formed.

Figure 2A:
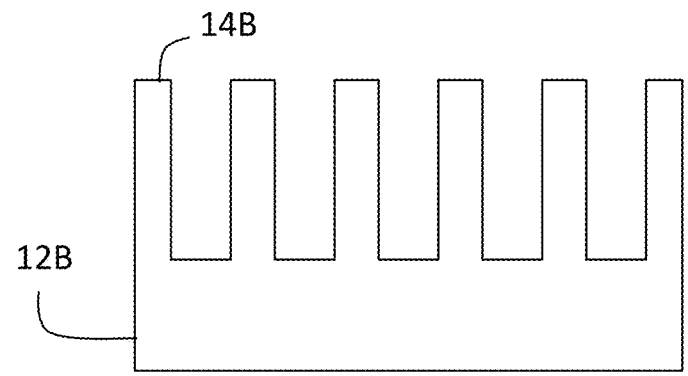
FIGS. 2A-2C illustrate in cross-sectional views fabrication of a master plate according to another embodiment of the present method in different stages of fabrication.
Figure 2B:
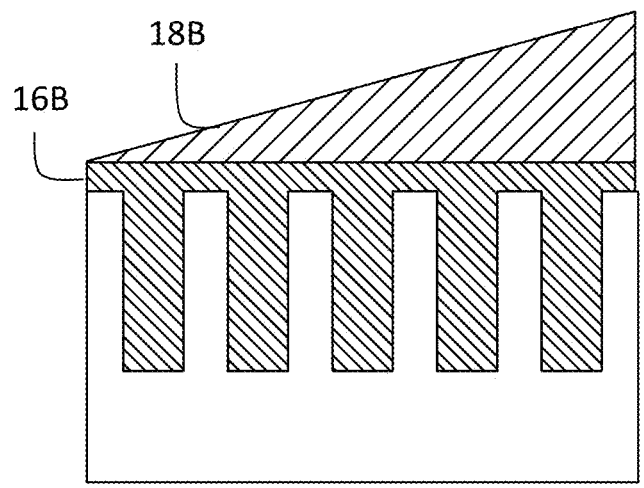
Figure 2C:
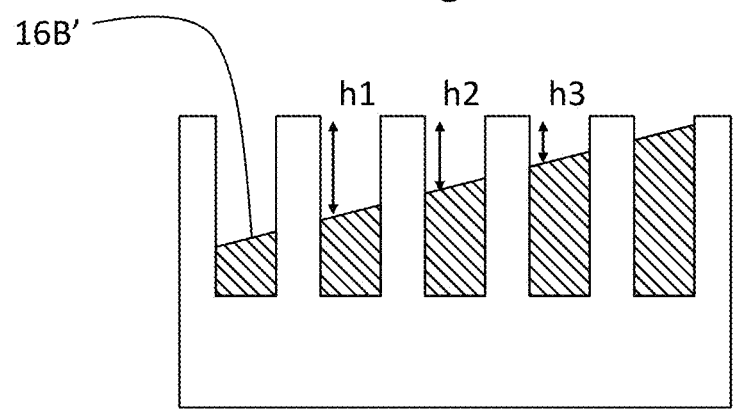
Figure 3:
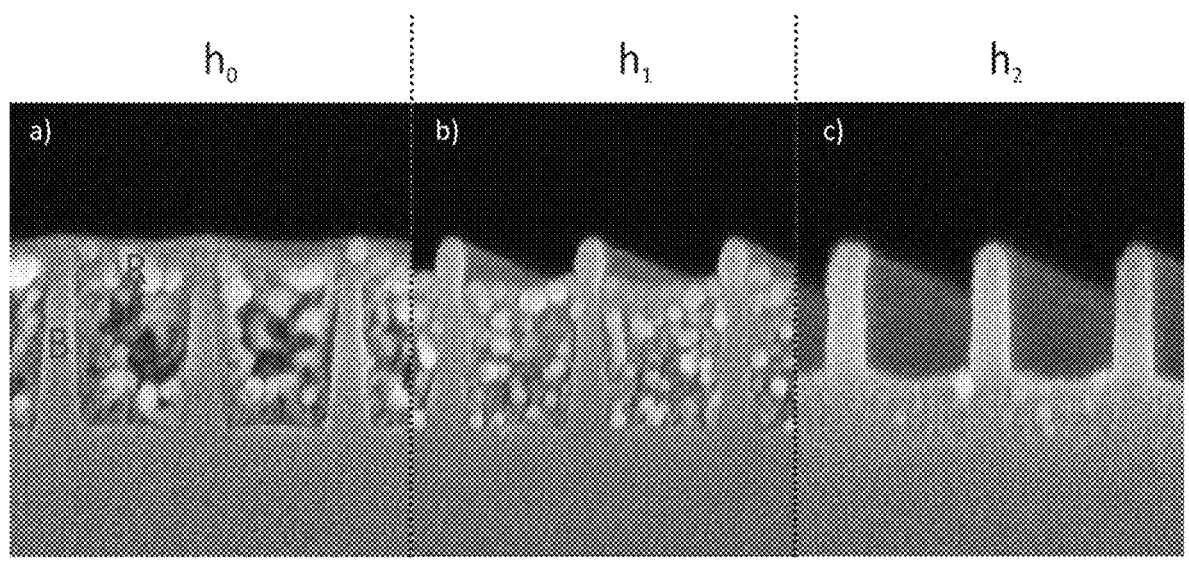
FIG. 3 shows a scanning electron micrograph of a binary structure planarized with resist material (a) and after etching to two different heights (b and c) using the method illustrated by FIGS. 1A-C.

FIGS. 2A-2C illustrate the second basic embodiment, which uses a physical mask to produce the height modulation.

In the first step illustrated by FIG. 2A, a binary structure 12B is fabricated using in a similar manner as described above with reference to the first basic embodiment.

Next, as shown in FIG. 2B, the binary structure is planarized with a fill layer 16B as described above.

On top of the fill layer 16B, a variable-height mask layer 18B is applied by any lithography method. Here, significantly lower lateral resolution is required in comparison with the grating layer resolution.

Next, as illustrated in FIG. 2C, a dry or wet etch method is used to transfer modulation of the mask layer 18B into the fill layer 16B'. Again, due to high selectivity between the fill layer 16B, 16B' and the grating layer 12B, high control over grating profile is retained.

In this example, a gradient mask is used, but, like in the previous example, the mask can comprise distinct regions of different heights. A combination of these approaches can also be used, depending on the desired height characteristics of the resulting master plate.

Both of the described basic embodiments allow for different diffraction efficiencies in a single high-quality diffractive structure as the vertical sidewall characteristics of the structure are defined by the substrate and height characteristics are defined by the masked etch process. Due to high selectivity between filling layer 16A, 16B and grating layer 12A-B, 14A-B, the full control over the grating line profiles is retained even if the etch process was isotropic.

It should be noted that also the binary surface profile of the substrate can be a resist structure or it can be transferred to the substrate by wet or dry etching. The structure is then typically coated with an electron beam or optical lithography resist which has selectivity with respect to the binary structure.

If a segmented plate is produced, the period of the grating is typically a fraction of minimum lateral dimensions of the mask zones, i.e. the segments have a considerably higher size with respect to the period. For example, the mask zones, which determine diffraction efficiency segments in the final product, can have dimensions of 10 µm or more, typically 1 mm or more, whereas the grating period is typically 10 µm or less, in particular 1 µm or less.

The substrate in all embodiments can be a standard silicon wafer or $SiO_2$ wafer, for example. Also, any other rigid or flexible substrate that can be applied in optical or electron beam lithography can be used.

The binary surface profile, i.e., a relief structure, can be etched to the aforementioned substrate or it can be processed into a thin film deposited on the substrate. In case of etching, this layer can be any thin film that can be processed in dry or wet etching methods.

Alternatively, the surface profile can be formed using an optical or electron beam resist, in which case the binary structure can be fabricated by optical or electron beam exposure and developed to the layer. The resist material can also be etched in order to fabricate the binary structure.

The filling layer can be an optical or electron beam resist. It can be applied by spin-coating, spray coating or dip-coating to mention some examples.

Alternatively, the filling layer can be deposited by using physical vapor deposition (PVD) or chemical vapor deposition (CVD) or atomic layer deposition (ALD). This can be for example a metal oxide such as $Al_2O_3$ or $TiO_2$ or other. It can also be $SiO_2$.

It is preferred that the filling layer has high selectivity with respect to the binary surface profile material, taking into account the removal method used (e.g. high etch selectivity). In other words, the filling material has to be selected so that during partial removal of this layer, the original binary structure remains intact.

The present height modulation can take place in the periodic dimension of the surface profile, as illustrated in the drawings. However, it is not excluded that it additionally or instead of that, takes place in the perpendicular dimension of the grating, for example along the grating lines of a line gradient. The present method is also equally applicable to two-dimensional gratings having periodicity in two different directions.

The present master plate can be used to produce diffractive optical elements having laterally non-constant diffraction efficiency for various needs. In particular, the plate can be used to produce large elements, typically having an area of 1 $cm^2$ or more, for example for NEDs or HUDs. Variable diffraction efficiency provides advantages in in-coupling gratings, exit pupil expanders and/or out-coupling gratings of diffractive waveguide displays, such as smart glasses and virtual reality and augmented reality displays.

The master plate produced using the present method can be used in stamping processes, which are known per se in the art of producing diffractive gratings.

Figure 4A:
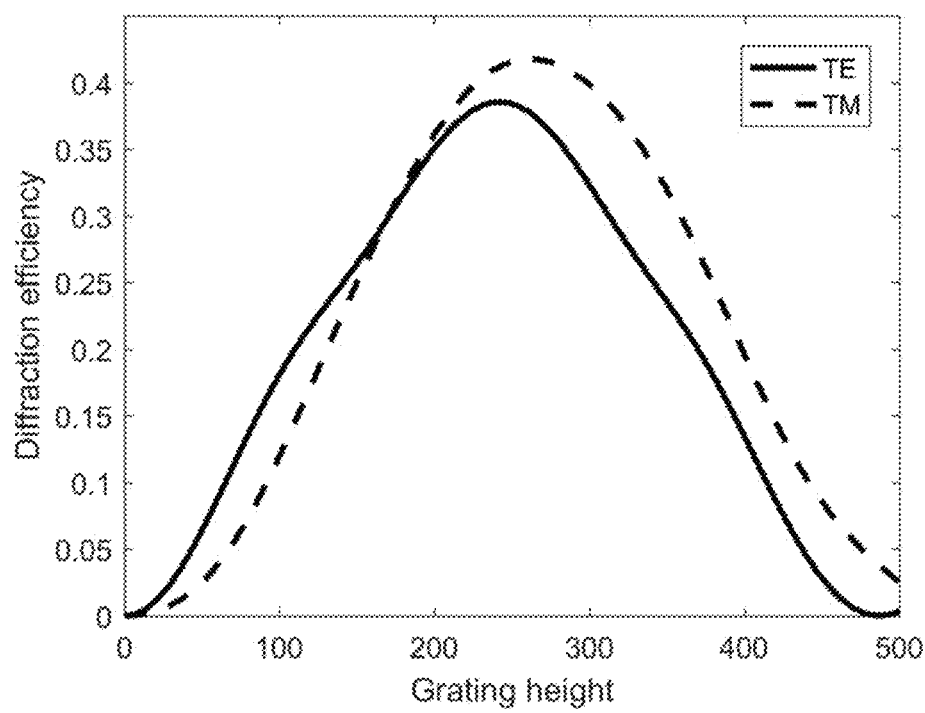
FIG. 4A shows an example how diffraction efficiency of the first transmission order of a binary 1D grating changes as a function of the grating height.
Figure 4B:
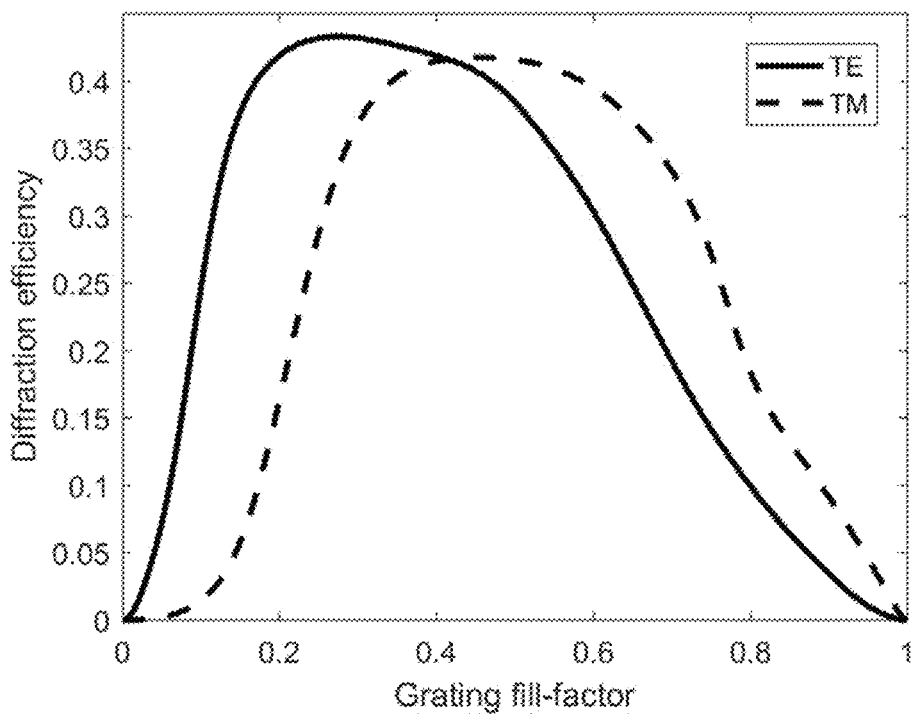
FIG. 4B shows an example how diffraction efficiency of the first transmission order of a 1D grating changes as a function of the grating fill-factor.

FIGS. 4A and 4B show how the diffraction efficiency of the first transmission order of a dielectric binary grating can be modulated using height and fill-factor modulation. Numerical results were obtained with the Fourier modal method (also known as rigorous coupled wave analysis). The binary grating resides on an interface between air and a glass substrate having refractive index of 2.0, the grating period is 500 nm, fill factor 0.5, and the grating is made of the same material as the substrate. The grating is illuminated with a plane wave with 450 nm free space wavelength at normal incidence. Results are shown for both transverse electric (TE) and transverse magnetic polarizations (TM). In FIG. 4A, the grating fill factor is 0.5 and in FIG. 4B, the grating height is 250 nm.

CITATIONS LIST

Non-Patent Literature

C. David, "Fabrication of stair-case profiles with high aspect ratios for blazed diffractive optical elements", Microelectronic Engineering, 53 (2000)

The invention claimed is:

1. A method of fabricating a master plate for producing diffractive structures, the method comprising:
   providing a substrate having a periodic initial surface profile,
   filling the initial surface profile uniformly at least partly with filling material, and
   partially removing the filling material in order to produce a master plate having a periodic height-modulated surface profile formed by said substrate and said filling material, wherein
   the initial surface profile comprises fill factor modulation, which is persisted in the height-modulated surface profile, and
   wherein said removing of the filling material partially comprises:
   applying a physical mask layer having an uneven height profile on the filling material, and
   removing at each location said mask layer and an underlying filling material, so as to replicate the height profile of the mask layer to corresponding sections of the filling material in order to produce said height-modulated surface profile.

2. The method according to claim 1, wherein said removing of the filling material partially comprises using grayscale lithographic removal of said filling material in order to produce said height-modulated surface profile.

3. The method according to claim 1, wherein said height-modulated surface profile comprises at least two distinct segments having different profile heights.

4. The method according to claim 1, wherein said height-modulated surface profile comprises a lateral height gradient profile, such as linear profile.

5. The method according to claim 1, wherein the height modulation of said height-modulated surface profile takes place at least in a periodic dimension of the surface profile.

6. The method according to claim 1, wherein the initial surface profile is entirely filled with said filling material in order to planarize the substrate before said removal.

7. The method according to claim 1, further comprising providing said periodic initial surface profile to the substrate by providing a substrate plate and removing material from the substrate plate, for example by electron beam lithography, or adding material to the plate, for example by nano-imprinting.

8. The method according to claim 1, wherein the initial surface profile is a binary profile.

9. The method according to claim 1, wherein the initial surface profile is a non-binary profile, such as a triangular profile or slanted profile.

10. The method according to claim 1, wherein said filling material is removed different amounts within different lateral segments in one dimensions only so as to produce a one-dimensionally height-modulated surface profile.

11. The method according to claim 1, wherein said filling material is removed different amounts within different lateral segments in two lateral dimensions so as to produce a two-dimensionally height-modulated surface profile.

12. The method according to claim 1, wherein the initial surface profile is periodic in one dimension or in two dimensions.

* * * * *